Sept. 13, 1927.  H. A. TURNER  1,642,277
CROSS ROW COTTON CHOPPER
Filed Nov. 19, 1926  2 Sheets-Sheet 1
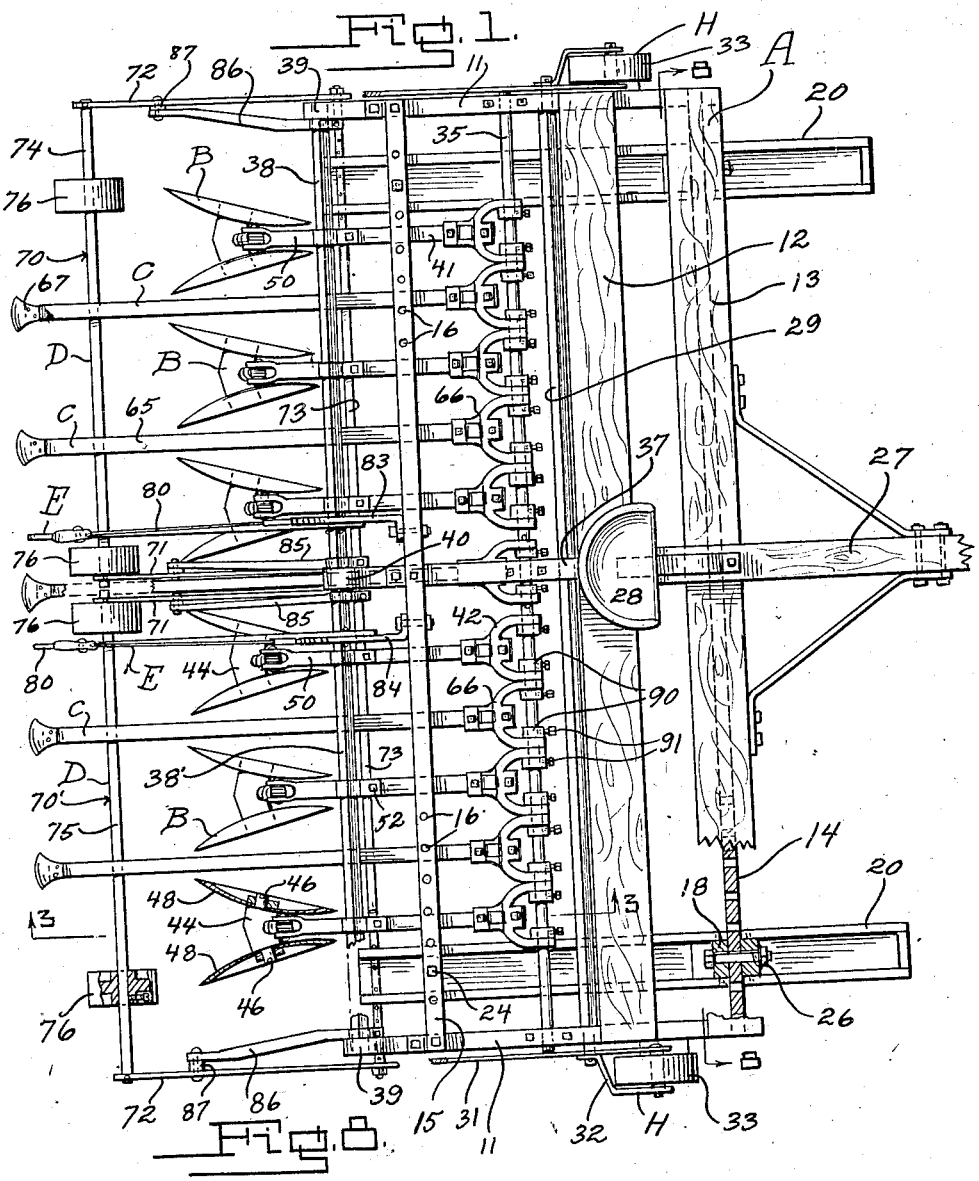
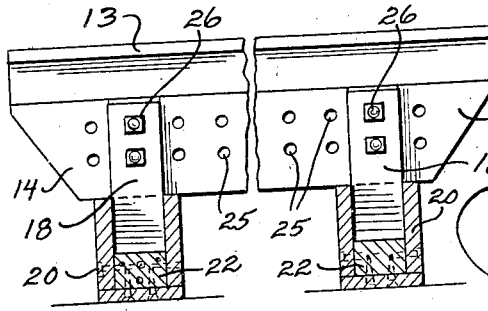
Harry A. Turner
Inventor Sept. 13, 1927.  H. A. TURNER  1,642,277
CROSS ROW COTTON CHOPPER
Filed Nov. 19, 1926  2 Sheets-Sheet 2

Inventor
Harry A. Turner
By Lancaster and Allwine
Attorneys

Patented Sept. 13, 1927.

1,642,277

UNITED STATES PATENT OFFICE.

HARRY A. TURNER, OF FERRIDAY, LOUISIANA.

CROSS-ROW COTTON CHOPPER.

Application filed November 19, 1926. Serial No. 149,410.

The present invention relates to improvements in cotton choppers, and the primary object of the invention is to provide an improved cross row cotton chopper which is intended to cultivate the cotton as it chops to a perfect stand, a drilled row of cotton.

A further object of the invention is to provide an improved cross row cotton chopper embodying adjustable features whereby the distance between the hills may be varied, and which implement will thoroughly cultivate between the formed hills thus eliminating the necessity of further cultivating after the chopping operation.

A further object of the invention is to provide a cotton working implement whereby the cotton may be worked and cultivated while it is small, without any danger of injuring the young plants.

A still further object of the invention is to provide a cotton chopper which is intended to chop the cotton and cultivate cross ways of the drills or rows, with the ground engaging portions of the implement so adjustable transversely of the implement as to cause the supporting ground engaging element to be disposed at locations between the hills being formed and thus eliminate possible injury to the plants desired left in the hills.

A still further object of the invention is to provide a cross row cotton chopper which will be of extremely simple and durable construction, and embodying elevating means whereby the ground penetrating implements may be readily raised out of contact with the ground when so desired.

Other objects and advantages of the invention will be apparent during the course of the following detailed description, taken in connection with the accompanying drawings forming a part of this specification and in which drawings:

Figure 1 is a top plan view of the cotton chopper, showing portions broken away for illustrating certain details of construction.

Figure 2 is a side elevation of the cotton chopper and showing the ground penetrating elements in a lowered operative position.

Figure 3 is an enlarged fragmentary section on line 3—3 of Figure 1.

Figure 4 is a fragmentary detail sectional view showing the mountings for certain of the supporting shafts of the implement and showing the manner in which the chopper discs may be adjusted for determining the distance to be left between the hills.

Figure 5 is a detail top plan view of the outer end of one of the lift arms for the sets of stopper discs.

Figure 6 is a transverse section on line 6—6 of Figure 7.

Figure 7 is an enlarged detail section taken substantially along the line 7—7 of Figure 3.

Figure 8 is a detail sectional view on line 8—8 of Figure 1 and showing the manner in which the forward end of the skids or runners may be adjusted toward and away from one another at their forward ends.

Referring to the drawings in detail, and wherein similar reference characters designate corresponding parts throughout the several views, the letter A designates a suitable truck upon which is mounted a plurality of killing devices or chopping structures B and cooperating cultivators C. The letter D may designate a hanger frame, and E elevating means whereby the chopper structures B and cultivators C may be elevated to an inoperative position.

The truck A, which may either be formed of metal or wood, comprises a frame 10 embodying a pair of parallel spaced apart side rails 11 connected adjacent their forward end by suitable cross braces 12 and 13, the cross brace 13 being provided with an edge piece 14. Connecting the rear portions of the side rails 11, is a suitable cross rail 15 provided adjacent each end with a series of vertically arranged apertures 16 for a purpose to be subsequently explained. The frame 10, is supported by means of suitable uprights or posts 17 and 18, upon skids or runners 20 which are of substantially U-shape in cross-section and which may either be formed of wood or other suitably light material. The uprights 17, and one of which abuts against the underside of each end of the cross rail 15, have their lower ends suitably anchored in the base of the runners 20 as at 21, while the uprights 18 are connected with the edge piece 14 and have their lower ends suitably anchored in the base of their respective runners as at 22. Thus it will be seen that the skids or runners 20 are mounted in parallel relation to the side rails 11. These runners 20 are adjustable toward and away from one another transversely of the chopper for permitting of the runners being disposed at a location whereby they will move between the hills to be formed by the chopper structures B. As before stated, the uprights 17 and 18 are rigidly secured at their lower ends to the respective runners, and the rear portions of the runners may be adjusted toward and away from one another by means of suitable bolts 24 which may be passed through the desired apertures 16 of the cross rail 15 and threaded into the upper end of the posts 17. The edge piece 14 of the cross rail 13 may be provided with suitable apertures 25 through which bolts 26 which extend through the post 18 may be passed for adjustment of the front end of the runners. It is preferred that the rear end of the runners 20 terminate directly below the rear ends of the side rails 11 as illustrated in Figures 2 and 3.

A tongue 27 may be rigidly connected in any suitable manner to the medial portions of the cross braces 12 and 13, and a suitable seat 28 may be provided for the operator of the implement.

A transporting means H is provided for ready movement of the implement from place to place, and comprises a shaft 29 which extends transversely of the truck with its ends mounted in suitable supports 30 carried by the side rails 11. Pivotally mounted at each end of the shaft 29, outwardly of the side rails 11, is a lever 31 having an offset bracket 32 provided below its pivotal connection for rotatable mounting of suitable ground wheels 33 which when the levers 31 are swung forwardly, move to positions below the runners 20 for elevating of the truck as illustrated in Figure 3. The levers 31 are mounted to swing independently of one another so that one side of the machine may be raised at a time, and when the levers are swung forwardly past dead center, engage suitable stop blocks 34 carried by the side rails 11.

Mounted transversely of the frame 10, is a cylindrical drag shaft 35 having its ends mounted in suitable brackets 36 supported below the side rails 11. This shaft 35 may also be mounted at its central portion in a suitable bracket supported below a center rail 37 arranged parallel with and at a point midway between the side rails 11.

Mounted at the rear end of the frame 10, and extending parallel with the shaft 35, is a two part rocker shaft embodying axially aligning sections 38 and 38'. The opposed ends of the shaft sections, and which are preferably square in cross section, are rotatably mounted in suitable bearings 39 secured to the upper side of the end rails 11, while the inner or adjacent ends of the aligning shaft sections are rotatably mounted in a suitable bearing 40 secured to the upper side of the center rail 37. Thus it will be seen that the shaft section 38 is permitted to rotate independently of the shaft section 38'.

Referring now to the hilling devices or chopper structures B, and any desired number of which may be employed for forming a desired number of hills, each embodies a disc beam 41 having a forked head 42 carried by its forward end, with the arms of the head pivotally mounted upon the transverse drag shaft 35. These forked heads 42 may be detachably secured to the disc beams 41 as by means of suitable bolts 43. Carried by the rear end of each of the disc beams 41, is a bearing block 44, secured to the beam as by means of a bolt 45, and provided at each end of the block, are angularly disposed spindles 46, the axes of which extend in rearwardly converging relation. Rotatably mounted on each of the spindles 46, is a chopper disc 48, with each set of discs arranged with their convex surfaces in confronting relation and with the discs of each set arranged in angular relation and converging toward their leading edges. The distance between the leading edges of each set of discs 48 will determine the size of the hills to be formed when the implement is moved transversely of the planted rows.

Each of the chopper structures B further includes a lift arm 50 provided at its forward end with a split head 51 which is adapted to be rigidly clamped to one of the square rocker shafts as by means of a bolt 52. The rear end of the lift arm is forked for providing a pair of parallel spaced apart arms 53 and between which is pivotally mounted as by means of trunnions 54, a guide block 55 provided with a bore 56 having its axis extending at a right angle to the axis of the trunnions 54. Slidably mounted in the bore 56 of the guide block 55, is a rod 57, the lower end of which is pivotally connected as by means of a bolt 58, between upstanding lugs 59 preferably formed integral with the bearing blocks 44. A cap 60 may be provided for the upper end of the rod 57 for limiting its downward movement through the guide block 55. This rod 57 is provided adjacent its lower end with a number of transverse keyways 61 for receiving a suitable pin 62, and an expansion coil spring 63 encircles the rod with its upper end engaging the lower side of the guide block 55 and its lower end engaging a suitable washer 64 held by the pin 62. Thus it will be seen that this expansion spring 63 normally tends to force the rod 57 downwardly through the guide block 55.

The cultivator C, and one of which is disposed between each of the chopper structures B, each embodies a beam 65 being of greater length than the disc beams 41, and each beam 65 is provided at its forward end with a forked head 66 which is adapted to be rotatably mounted upon the transverse drag shaft 35 between the disc beam head 42. These beams 65, and which extend rearwardly past the discs 48, have mounted at their rear ends suitable blades or sweeps 67, and which as will be seen from Figure 1, engage the ground between each of the sets of chopper discs 48.

The hanger frame D, which serves as a support for the rear end of the cultivator beams 65, is preferably formed of independent sections 70 and 70', with the section 70 arranged behind and cooperating with the rocker shaft section 38, and the hanger section 70' cooperating with the rocker shaft section 38'. Each of the hanger sections 70 and 70' embody rearwardly extending inner and outer pivot arms 71 and 72 respectively, the forward end of which arms are pivotally mounted upon a transversely extending rod 73 mounted in the rear ends of the runners 20. Rotatably mounted at the rear end of the pivot arms 71 and 72, are hanger shafts 74 and 75 arranged in axial alignment and associated respectively with the hanger sections 70 and 70'. These hanger shafts 74 and 75 are adapted to have the rear portions of the cultivator beams 65 rest freely thereupon, and by observing Figure 1 it will be seen that the medially disposed cultivator beam is permitted to rest upon the inner end of both of the hanger shafts. Rigidly mounted on each of the hanger shafts 74 and 75, and capable of being adjusted longitudinally therealong, are suitable gauge rollers 76 for gauging the depth of the cultivator blades 67. These rollers 76 are adjustable along their respective shafts in order that the rollers may be disposed out of the path of the leading edges of the discs 48.

The rod 73, and to which the forward end of the arms 71 and 72 are connected, is provided adjacent each end with suitable apertures 77 through which a cotter pin 78 may be passed for permitting of transverse adjustment of the runners 20 along the rod 73.

Referring now to the elevating means E for movement of the structures B and C into and out of working positions, one of these elevating means is provided for each of the rocker shaft sections 38 and 38' and their companion hanger sections 70 and 70' respectively. Each of the elevating means E for independent operation of certain sets of the structures B and C, embodies a lifting lever 80 rigidly carried one by each of the rocker shaft sections 38 and 38', and these levers preferably extend rearwardly from the rocker shaft and each is provided with a suitable latch mechanism provided with a keeper 82. Rigidly carried by the cross rail 15 at each side of the longitudinal center of the rail, are toothed segments 83 and 84 which extend rearwardly over the respective rocker shaft sections 38 and 38'. Rigidly clamped at their forward ends to opposite ends of the shaft sections 38 and 38', are inner and outer lift arms 85 and 86 respectively, and pivotally connected to the rear end of each lift arm, is a hanger link 87 the lower end of which is pivotally connected to the respective pivot arms 71 and 72.

By observing Figure 2, it will be seen that when the lifting lever 80 is swung upwardly, that the rear end of its respective lift arms 85 and 86 will also be swung upwardly, and by reason of the pivoted hanger links 87, the respective pivot arms 71 and 72 will swing upwardly about the rod 73 and elevate the cultivator blades 67 to a position above the bottom surface of the runners 20. This rotating of the rocker shaft by means of the lever 80, also swings the rear end of the lift arms 50 upwardly whereby the guide blocks 55 will engage the rod head 60 and elevate the chopper discs 48 to a position above the lower surface of the runners 20. The structures B and C may be retained in an elevated inoperative position by means of the keeper 82 engaging in suitable teeth of its respective segment. When the lever 80 is swung downwardly for lowering of the structures B and C, and locked at a desired position by means of the keeper 82, the expansion spring 63 will serve to yieldably cause the discs 48 to penetrate the ground to any desired depth. This spring 63 also serves for permitting the sets of discs to move upwardly when striking an obstruction.

While the implement has been shown as embodying independent sections which may be raised or lowered by independent elevating means, such has merely been provided for enabling the operator to easily raise and lower the sections, and if so desired the shaft sections 38 and 38', and the shaft sections 74 and 75 may be formed in one piece and operated by only one of the elevating means D. It will of course be understood that any desired number of the structures B and C may be provided in accordance with the desired size of the implements.

Mounted on the drag shaft 35, between the arms of each of the forked beam heads 42 and 66, are collars 90 each provided with a set screw 91 whereby the collars may be locked to the shaft 35 for retaining the forked beam head in adjusted positions along the drag shaft. It will readily be apparent the manner in which the forked beam heads 42 and 66 may be adjusted longitudinally along the shaft 35 for varying the distance between the hills to be formed by each set of chopper discs 48. The collars 90 arranged between the beam heads 66 will permit of the cultivators to be centered between their adjacent sets of chopper discs 48. When varying the spacing between the sets of chopper discs 48, it will become necessary to change the positions of the runners 20 and gauge rollers 76 in order to dispose the runners and rollers out of the path of the leading edges of the chopper discs, and for this reason the runners 20 and rollers 76 have been made adjustable transversely of the implement.

In operation, and when the implement is being drawn transversely across the drills or rows, the discs 48 will cultivate the ground and each set will cut the rows of plants for forming the desired hills, while the blades 67 traveling in the rear of the chopper blades and between each set of blades, will cultivate between the hills, that portion of the ground not turned by the discs 48.

From the foregoing description it will be apparent that an extremely novel and efficient cross row cotton chopper has been provided embodying cultivating blades and rolling discs adjustable for permitting of various distances being formed between hills of the young plants, and embodying adjustable ground engaging portions so adjustable with respect to the rolling chopper discs as to be disposed out of the path of the leading edges of the discs when the discs are adjusted to various widths.

Changes in detail may be made to the specific form of the invention herein shown and described, without departing from the spirit of the invention or the scope of the following claims:

I claim:

1. A cotton chopper comprising a truck embodying a frame and runners for suporting the frame, a shaft mounted transversely of the frame, independent chopper structures pivotally mounted on said shaft and each embodying a set of angularly arranged chopper discs, and independent cultivators pivotally mounted on the shaft between each pivotal mounting of the chopper structures and embodying beams extending rearwardly between each set of chopper discs and provided at their rear ends with blades for penetrating the soil between the sets of chopper discs.

2. A cotton chopper comprising a truck embodying a frame and runners for supporting the frame, a shaft mounted transversely of the frame, chopper structures pivotally mounted on said shaft and adjustable longitudinally therealong, and each embodying a set of angularly arranged chopper discs, and cultivators pivotally mounted on the shaft between each pivotal mounting of the chopper structures and adjustable longitudinally along the shaft, said cultivators embodying beams extending rearwardly between each set of chopper discs and provided at their rear ends with blades for penetrating the soil at a point midway between the sets of adjustable chopper discs.

3. A cotton chopper comprising a truck embodying a frame and runners for supporting the frame, a shaft mounted transversely of the frame, independent chopper structures pivotally mounted at their forward ends on said shaft and each embodying a set of angularly arranged chopper discs, independent cultivators pivotally mounted at their forward ends on the shaft between each pivotal mounting of the chopper structures and embodying beams extending rearwardly between each set of chopper discs and provided at their rear ends with blades for penetrating the soil between the sets of chopper discs, and a single elevating means for the chopper structures and cultivators for swinging the same upwardly about their pivotal connections with said shaft.

4. A cotton chopper comprising a truck embodying a frame and runners for supporting the frame, a shaft mounted transversely of the frame, chopper structures pivotally mounted on said shaft and each embodying a set of angularly arranged chopper discs, a hanger frame pivotally mounted on the truck and embodying a transverse hanger shaft arranged rearwardly of the chopper discs, cultivators pivotally mounted on said first mentioned shaft between each pivotal mounting of the chopper structures and embodying beams extending rearwardly between each set of chopper discs and resting at their rear ends on said hanger shaft, and means for swinging said hanger frame upwardly about its pivotal connection for elevating of the cultivators.

5. A cotton chopper comprising a truck embodying a frame and runners for supporting the frame, a drag shaft mounted transversely of the frame, chopper structures pivotally mounted on said shaft and each embodying a set of angularly arranged chopper discs, a hanger frame pivotally mounted on said truck and embodying a hanger shaft extending transversely of the truck behind said chopper disc, cultivators pivotally mounted on the shaft between each pivotal mounting of the chopper structures and embodying beams extending rearwardly between each set of chopper discs and resting freely at their rear ends upon said hanger shaft, and an elevating means operatively connected with said chopper structures and cultivators for unitary movement of the same into and out of ground penetrating positions.

6. A cotton chopper comprising a truck embodying a frame and runners for supporting the frame, a drag shaft mounted transversely of the frame, chopper structures pivotally and adjustably mounted on said shaft and each embodying a set of angularly arranged chopper discs, a hanger frame pivotally mounted on the truck and embodying a hanger shaft extending transversely of the truck to the rear of said chopper discs, cultivators pivotally and adjustably mounted on the shaft between each pivotal mounting of the chopper structures and embodying beams extending rearwardly between each set of chopper discs and resting freely at their rear ends upon said hanger shaft, and gauge wheels mounted on said hanger shaft and adjustable longitudinally therealong out of the path of the leading edges of said chopper discs.

7. In a cotton chopper, a frame, a drag shaft mounted transversely of the frame, a rocker shaft mounted parallel with and to the rear of the drag shaft, draw bars pivotally mounted upon said drag shaft and extending rearwardly below said rocker shaft, a set of angularly arranged chopper discs mounted at the rear of each draw bar, cultivators pivotally mounted on the shaft between each pivotal mounting of said draw bars and each embodying a draw bar extending rearwardly between each set of chopper discs, means for supporting the rear portions of the cultivator and chopper disc draw bars, and operatively connected to said rocker shaft, and means for rotating the rocker shaft for unitary raising and lowering of all of the draw bars about their pivotal mounting on the drag shaft.

8. A cotton chopper comprising a supporting frame, runners for supporting the frame and adjustable transversely of the frame, a shaft mounted transversely of the frame, chopper structures pivotally mounted on said shaft and adjustable longitudinally therealong, and each embodying a set of angularly arranged chopper discs, cultivators pivotally mounted on the shaft between each pivotal mounting of the chopper structures and adjustable longitudinally along the shaft, and embodying beams extending rearwardly between each set of chopper discs, a hanger frame for supporting the rear ends of said cultivator beams, and elevating means for the chopper structures and cultivators.

HARRY A. TURNER.